Jan. 23, 1968  P. JACOBS  3,365,002
CULTIVATOR SHANK RELEASE ASSEMBLY
Original Filed Jan. 17, 1964  2 Sheets-Sheet 1

INVENTOR.
PAUL JACOBS
BY
Tweedale & Gerhardt
ATTORNEYS.

Jan. 23, 1968 P. JACOBS 3,365,002

CULTIVATOR SHANK RELEASE ASSEMBLY

Original Filed Jan. 17, 1964 2 Sheets-Sheet 2

INVENTOR.
PAUL JACOBS
BY
Tweedale & Gerhardt
ATTORNEYS.

United States Patent Office 3,365,002
Patented Jan. 23, 1968

3,365,002
CULTIVATOR SHANK RELEASE ASSEMBLY
Paul Jacobs, Box 68, Sylvania, Saskatchewan, Canada
Continuation of abandoned application Ser. No. 338,372,
Jan. 17, 1964. This application Jan. 10, 1967, Ser. No. 617,444
6 Claims. (Cl. 172—269)

ABSTRACT OF THE DISCLOSURE

A cultivating shank mounted in a shank holding member pivoted to a supporting bracket. A spring loaded lever has a cam surface engaged with a roller carried by the shank holding member and urges the shank holding member to hold the shank in an earthworking position. A projecting portion intermediate the ends of the cam surface provides a high initial resistance to pivotal movement of the shank holding member.

CROSS-REFERENCE TO RELATED APPLICATIONS

This application is a continuation of my copending application Ser. No. 338,372, filed Jan. 17, 1964 (now abandoned).

BACKGROUND OF THE INVENTION

*Field of the invention*

The invention relates to apparatus including an earthworking element having means permitting the element to shift about a fixed point on its support when it encounters excessive forces, with resilient means for returning the element to its operative position upon removal of the excessive forces.

*Description of the prior art*

Prior art apparatus of this type include those having cushioning springs and an overload release latch, the springs taking over when the latch releases, for example see U.S. Patents 2,935,144 and 3,173,494, as well as those utilizing toggle links to obtain a tripping action as shown in Australian Patent 207,039. The former type usually require that the cultivating tool slide relative to the support for releasing the latches, or the overcoming of a friction engagement, the magnitude of which is difficult to control and maintain as the various parts wear under normal working conditions of cultivating tools. In the latter type, toggle links frequently jam, particularly after the parts begin to wear with continued use. The links may reach an overcenter or dead center relationship when the tool trips thus requiring manual actuation of the tool to its working position.

SUMMARY OF THE INVENTION

In accordance with the present invention, a cultivator shank is pivotally mounted on a supporting bracket for movement between operative, earthworking and inoperative, tripped positions relative to the supporting bracket. A lever is also pivotally mounted on the supporting bracket and is biased to a position to hold the shank in its operative position. A roller carried by the shank engages the lever and moves along the length of the lever as the shank moves from its operative to tripped position. The surface of the lever along which the roller moves is formed with a projection or hump to provide a high initial resistance to movement of the roller and hence tripping of the shank. When the roller moves past the projection, the lever offers decreasing resistance to movement of the shank to its tripped position, and causes the shank to return to its operative position when the force causing tripping is removed.

DESCRIPTION OF THE PREFERRED EMBODIMENT

Figure 1:
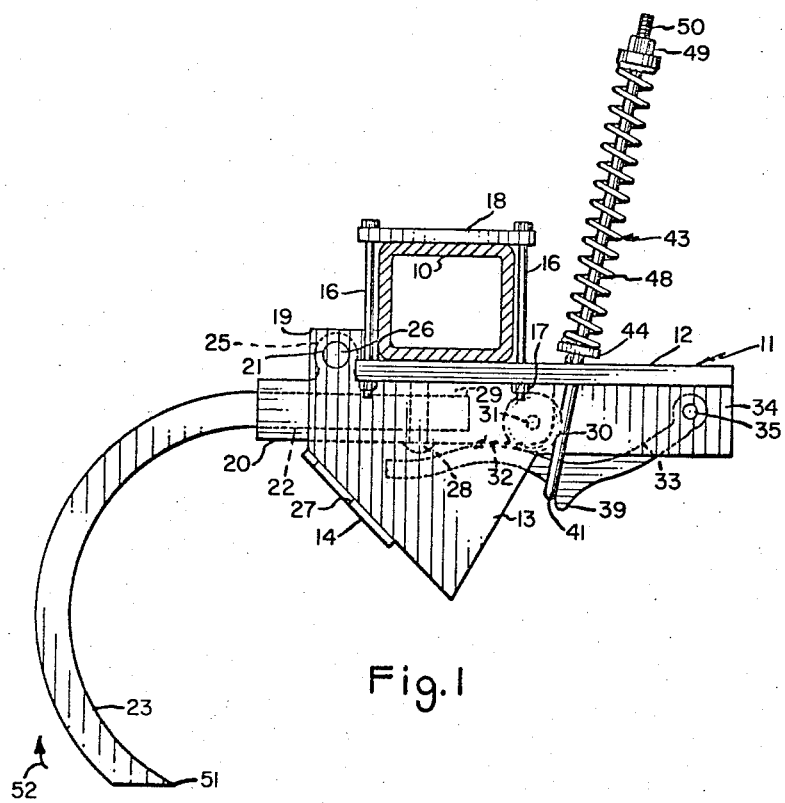
FIGURE 1 is a side elevation of a cultivator shank mounting embodying the invention, with the cultivator shank in the ground engaging or operating position.

With reference to the accompanying drawings, reference numeral 10 illustrates a transverse supporting frame member of a cultivator to which is secured a main supporting bracket collectively designated by reference numeral 11.

Figure 4:
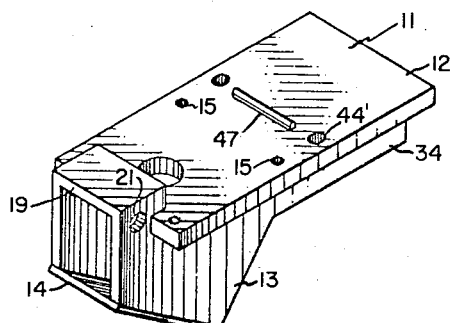
FIGURE 4 is an enlarged perspective view of the main supporting bracket.

The main supporting bracket 11 is shown in detail in FIGURE 4 and includes a relatively planar upper plate 12, downwardly depending, spaced, parallel side plates 13, and an inclined base plate 14.

Apertures 15 are formed through the upper plate 12 engageable by bolts 16 and nuts 17 which, in conjunction with attachment plate 18, secure the main support bracket 11 to the transverse frame member 10.

Adjacent the front end 19 of the main supporting bracket 11, the side plates 13 extend above the level of the upper plate 12 to form a pivotal attachment location for a shank holder 20, apertures 21 being formed through these extensions as clearly shown in FIGURE 4.

Figure 3:
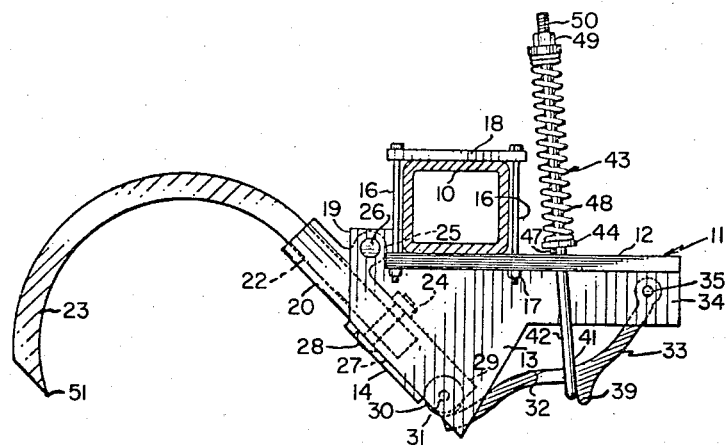
FIGURE 3 is a view similar to FIGURE 1 with the cultivator shank in the tripped or fully released position.

The shank holder 20 is of square cross sectional configuration and receives the shank 22 of a cultivator tool in the form of a shovel component 23, the shank being held in position by means of a bolt and nut assembly 24 passing through the shank holder 20 and the shank 22 as shown in phantom in FIGURES 1 and 3.

The shank holder is provided with a pivotal bearing boss 25 intermediate the ends thereof through which pivot pin 26 engages and is pivotal within the aforementioned apertures 21.

Figure 2:
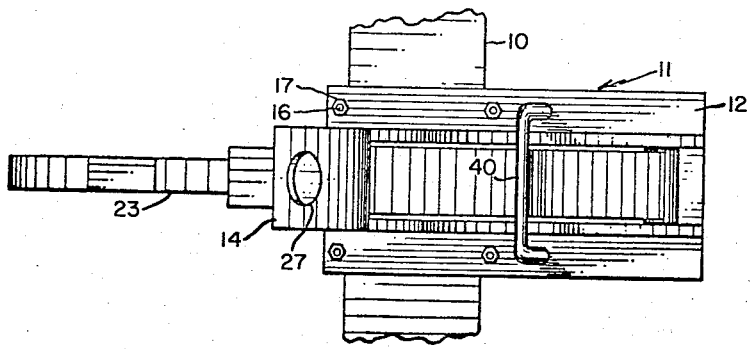
FIGURE 2 is a bottom plan view of the device of FIGURE 1.

An aperture 27 is formed within the base 14 of the main supporting bracket as shown in FIGURE 2 for receiving the bolt head 28 of the nut and bolt assembly 24 holding the shank to the shank holder.

Journalled for rotation within the rear end 29 of the shank holder is friction reducing device taking the form of a roller 30 journalled upon pin 31. Roller 30 is engageable upon the upper surface 32 of a lever in the form of a contoured cam plate collectively designated 33. Lever 30 is pivotally secured within the main supporting bracket 11 adjacent the rear end 34 thereof by means of a pin 35 as clearly shown in the drawings.

Figure 5:
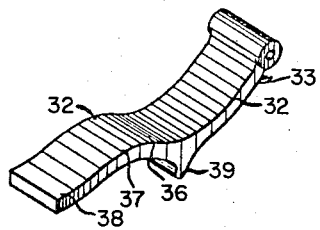
FIGURE 5 is a perspective view of the contoured cam plate or lever.

The upper surface 32 of the lever 33 is curved as shown in FIGURES 1, 3 and 5, and includes a normal shank operating position portion 36 and arcuately curved hump portion or projection 37 adjacent to the portion 36 and a reverse curve shank release position portion 38 adjacent the hump portion 37 and the aforementioned roller 30 is adapted to run on this arcuately curved upper surface during the operation of the device as will hereinafter be described.

Depending from the underside of the cam plate 33 is a transverse projection 39 engageable by the transverse portion 40 of a U-bolt 41. The U-bolt 41, which includes upwardly extending spaced and parallel legs 42, forms part of a resilient spring assembly collectively designated 43. Elongated apertures 44' are formed within the upper plate 12 of the main supporting bracket and the legs 42 of the U-bolt 41 extend freely through the elongated slots so that the U-bolt can rock from the position shown in FIGURE 1 to the position shown in FIGURE 3.

Figure 6:
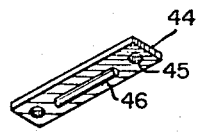
FIGURE 6 is a perspective view of the guide and rocking plate per se.

To accommodate the rocking action, a guide plate 44 (shown in FIGURE 6) apertured at the ends thereof as at 45 is freely engageable over the legs 42 of the U-bolt and above the main supporting bracket 11. A transverse bar 46 is formed on, or secured to the underside of guide plate 44, and is engageable with a similar transverse bar 47 formed, on, or secured to the upper surface of the upper plate 12 of the main supporting component between the aforementioned elongated slots 44', the bar 46 engaging behind the bar 47 for rocking action as clearly illustrated.

A resilient tension spring 48 is engageable over each leg of the U-bolt and reacts between the guide plate 44 and adjustable nut assemblies 49 screw threadable engageable upon the upper extremities 50 of the legs 42.

In operation, the device takes up the position shown in FIGURE 1 with the cultivator assembly 23 being shown in the ground engaging or cultivating position, under which circumstances the roller 30 engages the portion 36 of the cam plate which is maintained in contact with this roller by means of the spring assemblies 43 and it will be noted that the spring assemblies incline rearwardly as shown in FIGURE 1.

When a solid obstruction is met by the cultivator point 51, the cultivator pivots upon pin 26 in the direction of arrow 52 thus forcing the cam plate 33 downwardly. However, due to the projection or hump portion 37, the spring assemblies 43 offer the most resistance for the initial travel until the roller passes over the hump and onto the reverse curved postion 38 under which circumstances, of course, the spring pressure is reduced thus permitting the cultivator component 23 to take up the fully released position shown in FIGURE 3. However, the resilient spring assemblies 43 still apply sufficient pressure to the underside of the cam plate 33 to re-engage the cultivator point 51 with the ground once the obstruction has been passed.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A cultivator shank release assembly comprising; a supporting bracket, a cultivator shank mounted on the supporting bracket for pivotal movement relative to the supporting bracket about a fixed axis between an operative, earthworking position and an inoperative, tripped position, plate means on the supporting bracket engaging the shank in its operative position such that the shrank can pivot relative to the supporting bracket in one direction only from the operative position, a lever pivotally mounted on the supporting bracket, friction reducing means carried by the shank; means biasing the lever to engage the friction reducing means and urge the shank to its operative position with the shank held against said plate means by said lever, said friction reducing means moving along the lever toward the pivotal axis thereof as the shank moves toward its operative position and said friction reducing means moving along said lever away from the pivotal axis as the shank moves toward its tripped position to force the lever to pivot against the biasing means, and means projecting from the lever intermediate the ends thereof into the path of the friction reducing means when the shank is in the operative position to provide high initial resistance to movement of the shank toward the tripped position, said lever providing progressively decreasing resistance to movement of the shank toward the tripped position upon movement of the friction reducing means past the projecting means.

2. A cultivator shank release assembly as claimed in claim 1 wherein said lever is formed with a cam surface along the length thereof for engagement by said friction reducing means, said cam surface having first and second portions separated by said projecting means, and wherein said projecting means comprises an arcuately curved hump portion.

3. A cultivator mounting assembly comprising: a supporting bracket; a shank holding member pivotally mounted on the supporting bracket; a cultivator shank for carrying a cultivating tool secured to the shank holding member; said shank holding member being pivotal relative to the supporting bracket between an operative position to hold the cultivating tool in an earthworking position and a tripped position to hold the cultivating tool in a non-earthworking position, said shank holding member being engaged by the supporting bracket in its operative position such that the shank holding member can pivot relative to the supporting bracket in one direction only from said operative position; a lever member having one end pivotally mounted on the supporting bracket at a point spaced from the pivotal connection between the shank holding member and the supporting bracket; friction reducing means on the shank holding member; spring means connected between the supporting bracket and lever member biasing the lever member into engagement with the friction reducing means and biasing the lever member to pivot in a first direction to a position holding the shank holding member in its operative position nested between the supporting bracket and lever member such that the shank holding member can pivot to its tripped position only by forcing the lever member to pivot against the biasing force of the spring means in a direction opposite to said first direction ot permit the friction reducing means to move along the length of the lever member, and means projecting from the lever member intermediate the ends thereof to provide a high initial resistance to movement of said friction reducing means along the portion of the lever member between the projecting means and said one end of the lever member when the shank holding member is in its operative position such that the shank holding member will move from its operative to tripped positon only when the cultivating tool encounters excessive forces sufficient to overcome the resistance of said projecting means of movement of the friction reducing means, the portion of said lever member between said projecting means and the free end thereof providing a decreasing resistance to movement of said friction reducing means toward the tripped position of the shank holding member, said spring means causing the lever member to force the shank holding member to return to its operative position upon removal of said excessive forces.

4. A releasable shank holder for cultivators and the like attachable to a transverse support of a cultivator, comprising in combination a main supporting bracket securable to said transperse support, a shank holder pivotally secured within said main supporting bracket, a cultivator shank member secured to said shank holder, a lever member taking the form of a contoured cam plate also being pivotally secured within said main supporting bracket, friction reducing means at one end of said shank holder engageable with the surface of said lever member, and a resilient spring assembly mounted on said main supporting bracket and coacting with said contoured cam plate to apply resilient pressure to said contoured cam plate thereby maintaining said contoured cam plate in contact with said friction reducing means, said shank holder being pivotally secured intermediate the ends thereof to said main supporting bracket, said contoured cam plate being pivotally secured by one end thereof to said shank holder, said contoured cam plate including an upper surface profile having a first portion cooperating with said friction reducing means to provide an increased resistance to initial movement of said shank member from its operative position toward its tripped position, and a second portion cooperating with said cam follower providing a decrease in resistance to further movement of said shank member towards its tripped position, and an arcuately curved hump portion between said first and second portions.

5. The device according to claim 4 in which said lever member includes a downwardly depending spring assembly engaging portion, said spring assembly including bolts passing freely through said main support bracket, and engaging around said spring assembly engaging portion, a resilient spring surrounding each of said bolts and reacting between the upper surface of said supporting bracket and the upper ends of said bolts, and spring assembly locating and rocking means coacting between said upper surface and said spring assembly.

6. The device according to claim 5 in which said spring assembly locating and rocking means includes a transverse bar secured to said upper surface of said main supporting bracket, a guide plate engageable around said bolts above said main supporting bracket, and a transverse rocking bar on the underside of said guide plate engageable for rocking action with said transverse bar on the upper surface of said main support bracket.

No references cited.

ABRAHAM G. STONE, *Primary Examiner.*

J. R. OAKS, *Assistant Examiner.*